United States Patent
Sugiyama (10) Patent No.: US 10,379,796 B2
(45) Date of Patent: Aug. 13, 2019

(54) IMAGE FORMING APPARATUS

(71) Applicant: KYOCERA Document Solutions Inc., Osaka-shi, Osaka (JP)

(72) Inventor: Tsukasa Sugiyama, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/143,175

(22) Filed: Sep. 26, 2018

(65) Prior Publication Data

US 2019/0095142 A1   Mar. 28, 2019

(30) Foreign Application Priority Data

Sep. 28, 2017   (JP) ................................. 2017-188583

(51) Int. Cl.
*G06F 3/12* (2006.01)
*G03G 15/00* (2006.01)

(52) U.S. Cl.
CPC ......... *G06F 3/125* (2013.01); *G03G 15/5095* (2013.01); *G06F 3/1208* (2013.01); *G06F 3/1253* (2013.01)

(58) Field of Classification Search
USPC ....................................................... 358/1.15
See application file for complete search history.

(56) References Cited

U.S. PATENT DOCUMENTS

2017/0064137 A1*   3/2017   Shitara ................. H04N 1/3878
2018/0067702 A1*   3/2018   Lida; Toshihiko ... G06F 3/1255

FOREIGN PATENT DOCUMENTS

JP           05268454 A      10/1993

* cited by examiner

*Primary Examiner* — Neil R Mclean
*Assistant Examiner* — Darryl V Dottin
(74) *Attorney, Agent, or Firm* — Alleman Hall Creasman & Tuttle LLP (57) ABSTRACT

A condition acquiring device is for acquiring condition information including binding position information and image direction information. A dividing condition setting device is for specifying at least one dividing position and a dividing order of an original image, according to an image formation rule for deriving the at least one dividing position and the dividing order in response to a combination of what are designated by the image direction information and the binding position information. An image processing device is for dividing the original image at the at least one dividing position into a plurality of divided images. The print processing device is for forming the plurality of divided images respectively on a plurality of sheets sequentially conveyed by a conveying mechanism according to the dividing order.

3 Claims, 11 Drawing Sheets

| POST-PROCESSING (f25) | PRIORITY DESIGNATION (f24) | CORRECTION VALUE (W2) | VERTICAL CUT VALUE (H0) |
|---|---|---|---|
| NONE | OFF | 0 | 0 |
| STAPLE | OFF | 15mm | 0 |
| PUNCH | OFF | 25mm | 0 |
| NONE | ON | 0 | 8mm |
| STAPLE | ON | 0 | 15mm |
| PUNCH | ON | 0 | 25mm |

| STARTING POINT OF IMAGE (f22) | BINDING POSITION (f23) | PRIORITY DESIGNATION (f24) | DIVISION STARTING POINT (St0) |
|---|---|---|---|
| RIGHT END | RIGHT END | OFF | RIGHT END |
| RIGHT END | LEFT END | OFF | LEFT END |
| RIGHT END | RIGHT END OR LEFT END | ON | RIGHT END |
| LEFT END | RIGHT END | OFF | RIGHT END |
| LEFT END | LEFT END | OFF | LEFT END |
| LEFT END | RIGHT END OR LEFT END | ON | LEFT END |

FIG.7

| SHORT SIDE LENGTH OF IMAGE | PRIORITY DESIGNATION | SHEET ORIENTATION |
|---|---|---|
| 297 mm (A4 LONG SIDE) | OFF | A4 LANDSCAPE ORIENTATION |
| 210 mm (A4 SHORT SIDE) | OFF | A4 PORTRAIT ORIENTATION |
| 297 mm (A4 LONG SIDE) | ON | A4 PORTRAIT ORIENTATION |
| 210 mm (A4 SHORT SIDE) | ON | A4 LANDSCAPE ORIENTATION |

IMAGE FORMING APPARATUS

INCORPORATION BY REFERENCE

This application is based upon and claims the benefit of priority from the corresponding Japanese Patent Application No. 2017-188583 filed on Sep. 28, 2017, the entire contents of which are incorporated herein by reference.

BACKGROUND

The present disclosure relates to an image forming apparatus for dividing a long image into multiple images and printing the divided images.

When a print object is a long image whose length does not fit in a length of one sheet, the image forming apparatus may execute a dividing print process. The dividing print process is for dividing the long image into a plurality of divided images, and forming the divided images respectively on a plurality of sheets.

For example, there is known an image forming apparatus configured to divide the long image into a plurality of divided images starting from a rear end of the long image, and form the standard sized images respectively on a plurality of sheets.

SUMMARY

An image forming apparatus according to an aspect of the present disclosure includes a conveying mechanism, a condition acquiring device, a dividing condition setting device, an image processing device, and a print processing device. The conveying mechanism is for conveying a sheet. The condition acquiring device is for acquiring condition information including binding position information for designating one of an upstream end and a downstream end of the sheet in a sheet conveying direction. The dividing condition setting device is for setting, based on condition information, at least one dividing position and a dividing order in a longitudinal direction of an original image represented by input image data. The image processing device is for dividing the original image at the at least one dividing position into a plurality of divided images. The print processing device is for forming the plurality of divided images respectively on a plurality of sheets sequentially conveyed by the conveying mechanism according to the dividing order. The condition information further includes image direction information for designating which of two ends of the original image in the longitudinal direction is a starting end. The dividing condition setting device is for specifying the at least one dividing position and the dividing order according to a predetermined image formation rule for deriving the at least one dividing position and the dividing order in response to a combination of at least what are designated by the image direction information and the binding position information.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2A and FIG. 2B are diagrams schematically showing a long image.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

An image forming apparatus 10 according to the embodiment is a printer, a copying machine, a multifunctional peripheral, or the like capable of executing print processing for forming an image on a sheet 92.

[Configuration of Image Forming Apparatus 10]

Figure 1:
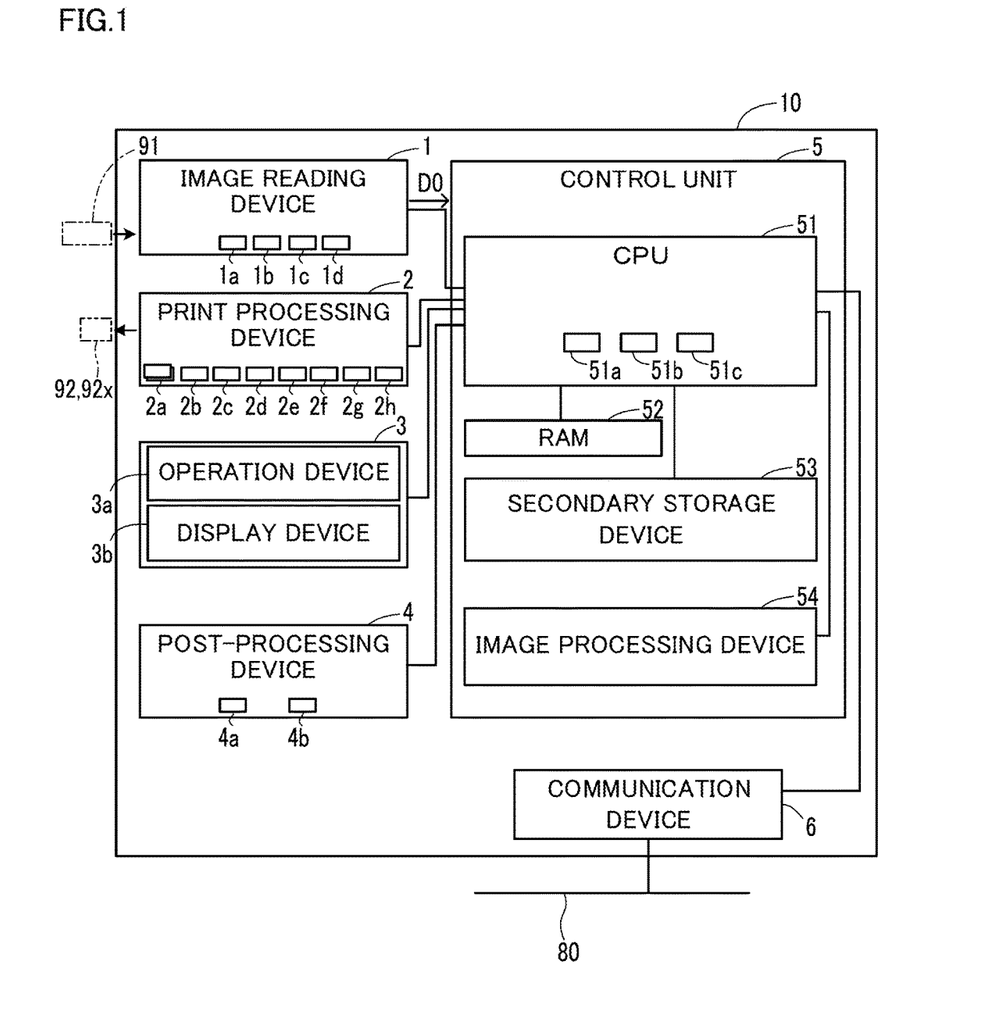
FIG. 1 is a block diagram of an image processing apparatus according to an embodiment.

As shown in FIG. 1, the image forming apparatus 10 includes an image reading device 1, a print processing device 2, a user interface device 3, a post-processing device 4, a control unit 5, and a communication device 6.

The user interface device 3 includes an operation device 3a and a display device 3b. The control unit 5 includes a CPU (Central Processing Unit) 51, a RAM (Random Access Memory) 52, a secondary storage device 53, and an image processing device 54.

The operation device 3a is for receiving an operation from a user, and may include a touch panel. The display device 3b can display information, and may include a display panel such as a liquid crystal panel.

The communication device 6 is a communication interface device that communicates via a network 80 with another device, such as a personal computer. The CPU 51 transmits and receives data to and from the other device all via the communication device 6.

The image reading device 1 executes a reading process for reading an image of a document sheet 91. The image reading device 1 includes a light source 1a, a scanning mechanism 1b, an image sensor 1c, and an AFE (Analog Front End) 1d.

The light source 1a emits light to the document sheet 91. The scanning mechanism 1b scans the light from the light source 1a on the document sheet 91. The image sensor 1c receives light reflected off the document sheet 91, and outputs a detection signal of an amount of light received as an image signal. The AFE 1d converts the image signal to digital image data.

Read image data D1 obtained by the image reading device 1 represents the image read from the document sheet 91. The read image data D1 is an example of input image data input to the image processing device 54.

The print processing device 2 executes a print process for forming an image on the sheet 92 by a predetermined method, such as an electrophotographic method or an inkjet method. In the present embodiment, the image reading device 1 and the print processing device 2 can execute a copy process, composed of the reading process and the print process that is performed based on the image data obtained by the reading process.

For example, in a case where the print processing device 2 executes the print process by the electrophotographic method, the print processing device 2 includes at least one sheet storing portion 2a, a conveying mechanism 2b, a photoconductor 2c, a charging device 2d, a laser scanning unit 2e, a developing device 2f, a transfer device 2g, and a fixing device 2h.

The sheet storing portion 2a is a container or a tray for storing a plurality of sheets 92. In the present embodiment, the image forming apparatus 10 includes two sheet storing portions 2a that respectively store the sheets 92 of a same size in different orientations.

For example, one of the two sheet storing portions 2a may store the sheets 92 of A4 size in landscape orientation, and the other sheet storing portion 2a may store the sheets 92 of A4 size in portrait orientation.

The conveying mechanism 2b sends out the sheet 92 from one of the sheet storing portions 2a that is selected by the CPU 51. Furthermore, the conveying mechanism 2b conveys the sheet 92 sent out from the sheet storing portion 2a along a sheet conveyance path inside a main body of the image forming apparatus 10.

The charging device 2d charges a surface of the photoconductor 2c. The laser scanning unit 2e writes an electrostatic latent image on the charged surface of the photoconductor 2c.

The developing device 2f develops the electrostatic latent image on the photoconductor 2c into a toner image. The transfer device 2g transfers the toner image from the photoconductor 2c to the sheet 92. The fixing device 2h heats the toner image on the sheet 92 to fix the toner image on the sheet 92.

Accordingly, the transfer device 2g and the fixing device 2h form an image on one or more sheets 92 conveyed by the conveying mechanism 2b.

The post-processing device 4 processes a preliminarily designated portion of the one or more sheets 92 on which images have been formed, sequentially conveyed by the conveying mechanism 2b. In the following description, the one or more sheets 92 on which images have been formed are collectively referred to as printed matter 92x.

In the present embodiment, the post-processing device 4 includes a stapling device 4a for stapling the printed matter 92x, and a punching device 4b for punching at least one punch hole in the printed matter 92x.

The CPU 51 is a processor for executing a program preliminarily stored in the secondary storage device 53. The CPU 51 executes various calculations and data processing, and controls various electric devices provided in the image forming apparatus 10. The CPU 51 is an example of a control device.

The CPU 51 is capable of exchanging data or control signals with the image reading device 1, the print processing device 2, the user interface device 3 the post-processing device 4, and the communication device 6.

For example, the CPU 51 operates as a process control device 51a by executing a process control program stored in the secondary storage device 53.

The process control device 51a controls the image reading device 1 and the print processing device 2. Accordingly, the process control device 51a makes the image reading device 1 and the print processing device 2 execute the copy process.

During execution of the copy process, the process control device 51a makes the image reading device 1 execute the reading process, and makes the print processing device 2 execute the print process based on the image data obtained by the reading process.

Furthermore, the process control device 51a receives print data D2 from the other device via the communication device 6, and makes the print processing device 2 execute the print process based on the image data included in the print data D2. The image data included in the print data D2 is an example of input image data that is input to the image processing device 54.

In addition, the CPU 51 operates as a user interface control device 51b by executing a user interface control program stored in the secondary storage device 53.

The user interface control device 51b inputs information according to an operation on the operation device 3a. Furthermore, the user interface control device 51b displays a notification screen, a selection menu screen, or the like including various types of information, on the display device 3b.

The RAM 52 is a main storage device for primarily storing the programs executed by the CPU 51, and data to be output and referred to during execution of the programs by the CPU 51.

The secondary storage device 53 is a computer-readable nonvolatile data storage device. The secondary storage device 53 can store programs and various types of data. The secondary storage device 53 may be an SSD (Solid State Drive) or a hard disk drive, or a combination thereof.

The image processing device 54 is a processor or a circuit for executing various types of image processing, such as a processing process, a data conversion process, and an image dividing process of the image data obtained by the image reading device 1 or the communication device 6. The image processing device 54 may be a processor such as an MPU (Micro Processing Unit) or a DSP (Digital Signal Processor). In addition, the image processing device 54 may also be a circuit such as an ASIC (Application Specific Integrated Circuit).

In the image forming apparatus 10, the image read from the document sheet 91 by the image reading device 1, or the image represented by the print data received from the other device via the communication device 6 may become an object for printing.

Figure 2A:
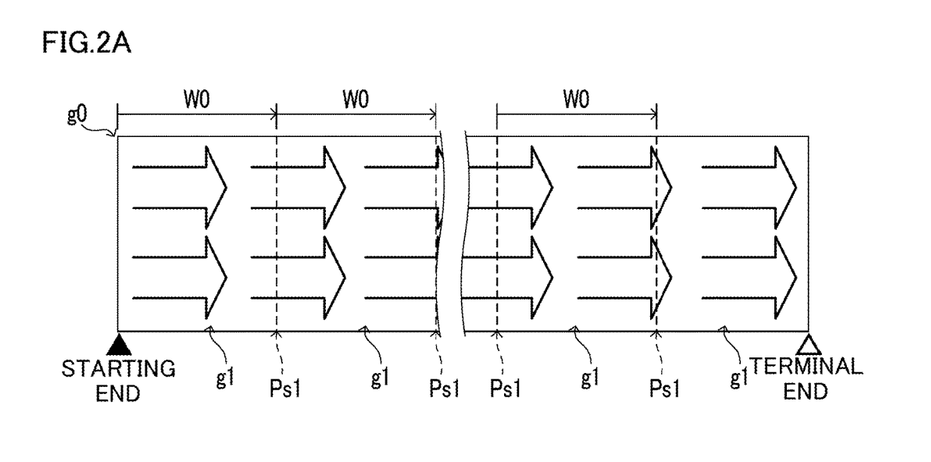
FIG. 2A schematically shows the long image starting from a left end, and FIG. 2B schematically shows the long image starting from a right end.
Figure 2B:
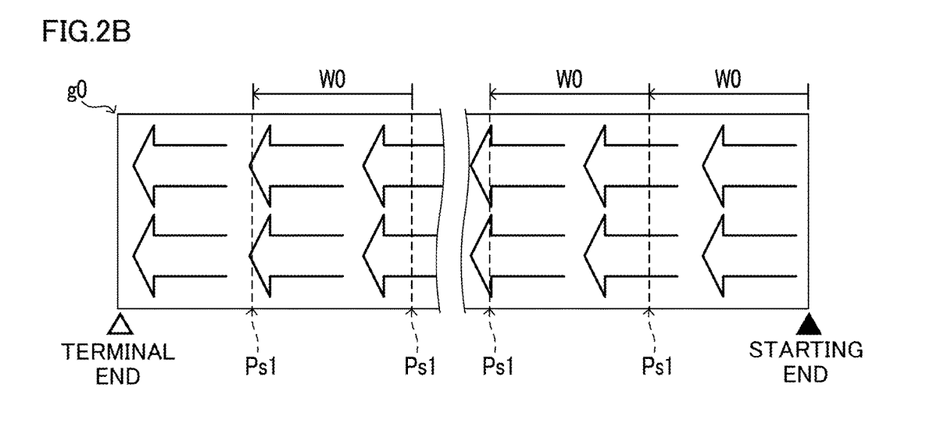

As shown in FIG. 2, the image that is the object for printing may be a long image g0 whose length does not fit in the length of one sheet 92. In the present embodiment, the image data included in the read image data D1 or the print data D2 may represent the long image g0. To deal with this case, the image forming apparatus 10 includes a function for executing a dividing print process.

The dividing print process divides the long image g0 into a plurality of divided images g1 in its longitudinal direction, and forms the divided images g1 respectively on the sheets 92. It is noted that the long image g0 is an original image that is an object for the dividing print process.

Meanwhile, the long image g0 may have significance in orientation of its longitudinal direction. In other words, one of two ends of the longitudinal direction of the long image g0 may be a starting end, and the other may be a terminal end (see FIG. 2).

FIG. 2A schematically shows the long image g0 in which its transverse direction is vertical, the longitudinal direction is horizontal, and a left end is the starting end of the longitudinal direction. FIG. 2B schematically shows the long image g0 in which the transverse direction is vertical, the longitudinal direction is horizontal, and a right end is the starting end of the longitudinal direction. Content of the long image g0 determines which of the two opposite ends of the long image g0 in the longitudinal direction is the starting end.

On the other hand, the sheets 92 on which the divided images g1 are respectively formed may be bound at a portion along one of their four sides. This provides a booklet-like piece of printed matter 92x in which the divided images g1 continue over a plurality of pages.

When the long image g0 has significance in the orientation of its longitudinal direction, dividing and printing procedures suitable for the long image g0 change depending on the combination of a binding position of the printed matter 92x and a significant orientation of the long image g0.

FIG. 2A shows an example in which the long image g0 is divided at a plurality of dividing positions Ps1 that are provided at an interval of a division width W0 sequentially from the left end to the right end. FIG. 2B shows an example in which the long image g0 is divided at a plurality of dividing positions Ps1 that are provided at an interval of the division width W0 sequentially from the right end to the left end.

For example, when the long image g0 disposed horizontally elongated starts at its left end, the binding position of the printed matter 92x may be set to a left side. In this case, as shown in FIG. 2A, the long image g0 is sequentially divided from a left end side by the dividing width W0 corresponding to one page of the printed matter 92x, and the print process of printing the long image g0 onto the sheets 92 is executed according to a dividing order in which the long image g0 is divided. Accordingly, in the printed matter 92x, the divided images g1 are arranged in a page order corresponding to the significant orientation of the long image g0.

In addition, when the long image g0 disposed horizontally elongated starts at its right end, the binding position of the printed matter 92x may be set to a right side. In this case, as shown in FIG. 2B, the long image g0 is sequentially divided from a right end side by the dividing width W0 corresponding to one page of the printed matter 92x, and the print process of printing the long image g0 onto the sheets 92 is executed according to an order in which the long image g0 is divided. Accordingly, in the printed matter 92x, the divided images g1 are arranged in the page order corresponding to the significant orientation of the long image g0.

However, when the long image g0 disposed horizontally elongated starts at its left end, the binding position of the printed matter 92x may be set to a right side. In this case, when the dividing print process is executed in the same procedure as the examples described above, the divided images g1 are arranged in the printed matter 92x in a page order opposite to the significant orientation of the long image g0. Accordingly, the printed matter 92x may have a sense of incongruity to a viewer.

The image forming apparatus 10 includes a function described below for executing the dividing print process in a suitable procedure, according to the significant orientation of the long image g0 and the binding position of the printed matter 92x.

[Setting of Condition Information]

The user interface control device 51b displays a selection screen f0 on the display device 3b, and then sets condition information relating to a condition of the dividing print process according to an operation on the operation device 3a. It is noted that the operation device 3a, the display device 3b, and the user interface control device 51b are examples of a condition acquiring device for acquiring the condition information.

Figure 3:
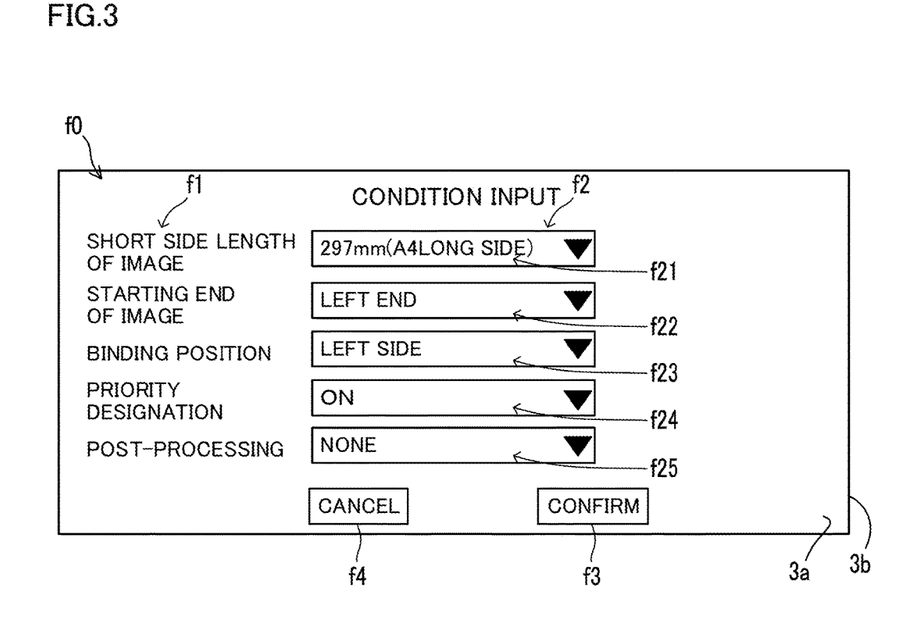
FIG. 3 is a diagram showing an example of a condition input screen in the image processing apparatus according to the embodiment.

For example, the user interface control device 51b may display the selection screen f0 on the display device 3b as shown in FIG. 3. The selection screen f0 includes information on a plurality of items f1 and a plurality of options f2 of the condition information.

Furthermore, in a state in which the selection screen f0 is displayed on the display device 3b, the user interface control device 51b sets the condition information according to a selection operation on the operation device 3a.

In the example shown in FIG. 3, the condition information includes short side length information f21, image direction information f22, binding position information f23, priority designating information f24, and post-processing information f25. It is noted that the condition information at least includes the image direction information f22 and the binding position information f23. That is, the condition information may not include one or more of the short side length information f21, the priority designating information f24, and the post-processing information f25.

The short side length information f21 designates a length of the transverse direction of the long image g0. For example, the options f2 for the short side length information f21 may be 297 mm (length of a long side of the standard A4 size) and 210 mm (length of a short side of the standard A4 size).

The image direction information f22 designates which one of the two ends in the longitudinal direction of the long image g0 is the starting end. In the present embodiment, the image direction information f22 designates which of the left end and the right end is the starting end of the long image g0 when it is disposed horizontally elongated. In this case, the options f2 for the image direction information f22 are "left end" and "right end".

When the image direction information f22 is "left end", the long image g0 corresponding to the image direction information f22 is an image in which the transverse direction is vertical, and a direction going from the left end to the right end is a forward direction. On the other hand, when the image direction information f22 is "right end", the long image g0 corresponding to that image direction information f22 is an image in which the transverse direction is vertical, and a direction going from the right end to the left end is the forward direction.

The binding position information f23 designates one of an upstream end and a downstream end in a sheet conveying direction of the sheet 92. The sheet conveying direction is a sub-scanning direction of the print process, and a direction orthogonal to the sheet conveying direction is a main scanning direction of the print process.

For example, the options f2 for the binding position information f23 may be "left side" and "right side". When the binding position information f23 is "left side", the binding position is a portion along the sheet 92 on its upstream end in the sheet conveying direction. Similarly, when the binding position information f23 is "right side", the binding position is a portion along the sheet 92 on its downstream end in the sheet conveying direction.

The binding position information f23 is designated even when neither a stapling process by the stapling device 4a nor a punching process by the punching device 4b is performed.

The priority designating information f24 designates whether or not continuity of the divided images g1 is prioritized over the binding position information f23. In the present embodiment, the options f2 for the priority designating information f24 are "ON" and "OFF".

When the priority designating information f24 is "ON", the continuity of the divided images g1 is prioritized over the binding position information f23. On the other hand, when the priority designating information f24 is "OFF", the binding position information f23 is prioritized over the continuity of the divided images g1.

The post-processing information f25 designates whether or not the post-processing device 4 processes the printed matter 92x. In the present embodiment, the options f2 for the post-processing information f25 are "none", "staple", and "punch".

When the post-processing information f25 is "none", the post-processing device 4 does not process the printed matter 92x. When the post-processing information f25 is "staple", the stapling device 4a performs the stapling process on the printed matter 92x. When the post-processing information f25 is "punch", the punching device 4b performs the punching process on the printed matter 92x.

When the post-processing information f25 is "staple", the process control device 51a makes the stapling device 4a execute the stapling process. In the stapling process, the stapling device 4a staples a portion corresponding to the binding position designated by the binding position information f23 in the sheets 92 on which images have been formed, sequentially conveyed by the conveying mechanism 2b.

In addition, when the post-processing information f25 is "punch", the process control device 51a makes the punching device 4b execute the punching process. In the punching process, the punching device 4b punches at least one punch hole in a portion corresponding to the binding position designated by the binding position information f23 in the sheets 92 on which images have been formed, sequentially conveyed by the conveying mechanism 2b.

In the example shown in FIG. 3, the selection screen f0 also includes a confirmation icon f3 and a cancel icon f4. The user interface control device 51b selects one of the options f2 for each of the items f1 according to the selection operation on the operation device 3a, and sets the selected option f2 as the condition information corresponding to the item f1. Furthermore, the user interface control device 51b confirms settings of the condition information when the confirmation icon f3 is operated.

It is noted that the user interface control device 51b cancels setting of the condition information when the cancel icon f4 is operated.

It is further noted that the communication device 6 may receive the condition information together with the print data from the other device. In this case, the communication device 6 is an example of the condition acquisition device for acquiring the condition information.

[Dividing Condition Setting Device 51c]

The CPU 51 operates as a dividing condition setting device 51c by executing a dividing condition setting program stored in the secondary storage device 53.

The dividing condition setting device 51c executes a dividing condition setting process for setting the division positions Ps1 and the dividing order in the longitudinal direction of the long image g0 based on the condition information. The long image g0 is represented by the image data included in the read image data or the print data.

The dividing condition setting device 51c specifies the division positions Ps1 and the dividing order according to a predetermined image formation rule. The image formation rule derives the division positions Ps1 and the dividing order according to a combination of at least the upstream end, the downstream end, and each of the two ends designated by the binding position information f23 and the image direction information f22.

As shown in FIG. 4 to FIG. 7, the image formation rule may include a first image formation rule R1, a second image formation rule R2, a third image formation rule R3, and a fourth image formation rule R4.

The first image formation rule R1 is an example of a rule for deriving a reference dividing width W1 from the short side length information f21. In the example shown in FIG. 4, when the short side length information f21 designates one of a length of a long side and a short side of the standard sized sheet 92, an undesignated length of the long side and the short side of the sheet 92 of the same size is derived by the first image formation rule R1 as the reference dividing width W1.

Figure 5:
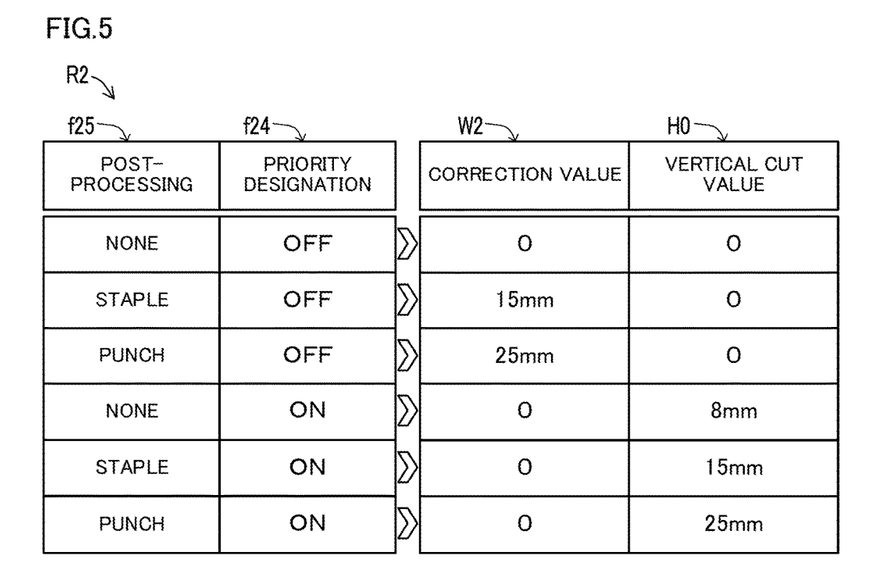
FIG. 5 is a diagram showing a second image formation rule in the image processing apparatus according to the embodiment.

The second image formation rule R2 is an example of a rule for deriving a correction value W2 and a vertical cut value H0 from a combination of "none", "staple", "punch", "ON", and "OFF" designated by the post-processing information f25 and the priority designating information f24. The dividing condition setting device 51c sets a value obtained by subtracting the correction value W2 from the reference dividing width W1 as the division width W0.

The vertical cut value H0 specifies a width of a print exclusion range in the two ends of the transverse direction of the long image g0. The image processing device 54 excludes from the divided images g1 a range with a width corresponding to the vertical cut value H0 measured from both ends in the transverse direction of the long image g0.

For example, the image processing device 54 excludes ranges of one-half of the vertical cut value H0 respectively from the two ends in the transverse direction of the long image g0, from the divided images g1. Accordingly, a total width excluded from a printing range in the transverse direction of the long image g0 is a width indicated by the vertical cut value H0.

In the example shown in FIG. 5, when the priority designating information f24 is "OFF", the second image formation rule R2 sets a predetermined value corresponding to a set value of the post-processing information f25 as the correction value W2, and derives zero as the vertical cut value H0.

FIG. 5 shows an example in which a plurality of correction values W2 are 0 mm, 15 mm, and 25 mm when set values of the post-processing information f25 are "none", "staple", and "punch", respectively.

Furthermore, when the priority designating information f24 is "ON", the second image formation rule R2 sets a predetermined value corresponding to the set value of the post-processing information f25 as the vertical cut value H0, and derives zero as the correction value W2.

FIG. 5 shows an example in which a plurality of vertical cut values H0 are 8 mm, 15 mm, and 25 mm when the set values of the post-processing information f25 are "none", "staple", and "punch", respectively.

As described above, a value obtained by subtracting the correction value W2 from the reference dividing width W1 is set as the division width W0. The image processing device 54 divides the long image g0 into the divided images g1 at the division positions Ps1 corresponding to the division width W0.

When the post-processing information f25 designates for the stapling process or the punching process to be performed, the print processing device 2 forms the divided images g1 in a range excluding an edge corresponding to a position designated by the binding position information f23 of the sheets 92. The correction value W2 specifies the width of the edge in which the divided images g1 are not formed on the sheets 92.

Furthermore, when the post-processing information f25 designates for the stapling process or the punching process to be performed, the post-processing device 4 performs a process corresponding to the post-processing information f25 on the sheets 92 on which images have been formed.

Figure 6:
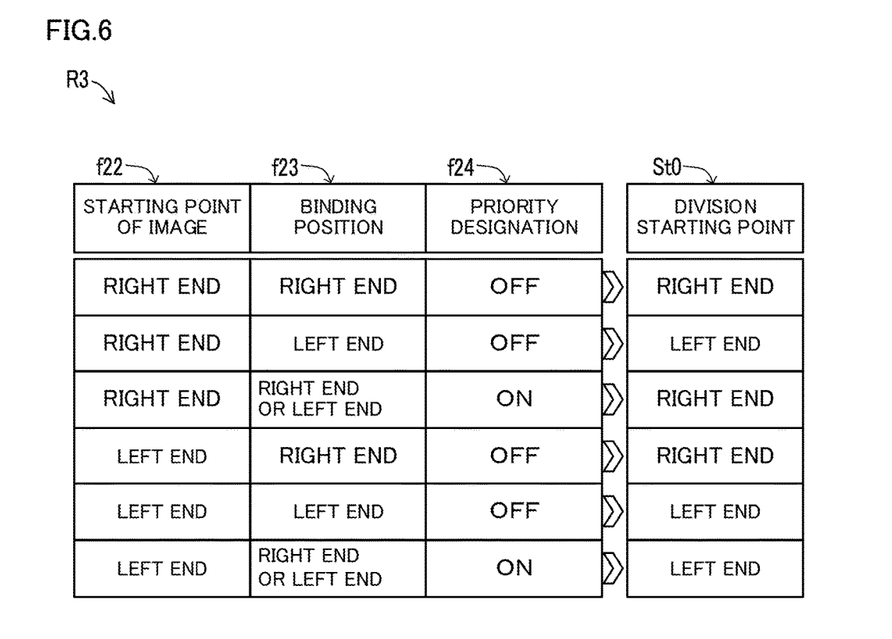
FIG. 6 is a diagram showing a third image formation rule in the image processing apparatus according to the embodiment.

The third image formation rule R3 is an example of a rule for deriving a division starting point St0 from a combination of what are designated by the image direction information f22, the binding position information f23, and the priority designating information f24. The division starting point St0 is a parameter for specifying which of the left end and the right end to start dividing the long image g0, when the long image g0 is disposed horizontally elongated.

In the present embodiment, the division starting point St0 and the division width W0 are examples of a parameter for specifying the division positions Ps1 and the dividing order. The image processing device 54 divides the long image g0 into the divided images g1 at the set division positions Ps1.

When the division starting point St0 is "right end", the image processing device 54 divides the long image g0 from its right end to its left end at the division positions Ps1, set apart from each other by the division width W0. Similarly, when the division starting point St0 is "left end", the image processing device 54 divides the long image g0 from its left end to its right end at the division positions Ps1, set apart from each other by the division width W0.

As shown in FIG. 6, when the priority designating information f24 is "OFF", the third image formation rule R3 derives a different division starting point St0 for each different binding position information f23, even if the image direction information f22 is the same.

Furthermore, when the priority designating information f24 is "ON", the third image formation rule R3 shown in FIG. 6 derives the division starting point St0 according to a set value of the image direction information f22, regardless of a set value of the binding position information f23.

Figure 4:
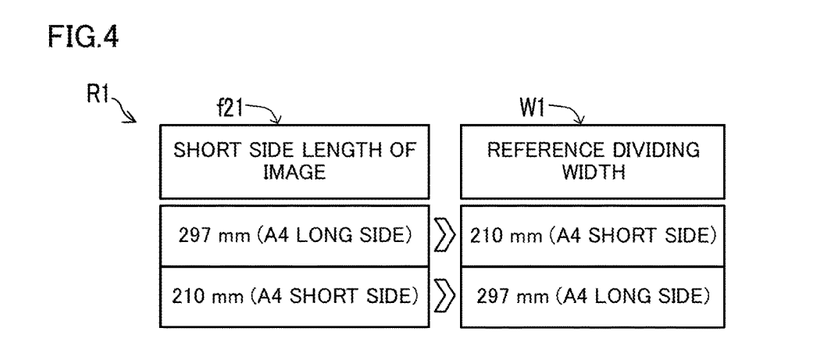
FIG. 4 is a diagram showing a first image formation rule in the image processing apparatus according to the embodiment.

The first image formation rule R1, the second image formation rule R2, and the third image formation rule R3 are examples of a rule for specifying the division positions Ps1 and the dividing order according to a combination of what are designated by the short side length information f21, the image direction information f22, the binding position information f23, the priority designating information f24, and the post-processing information f25.

Figure 7:
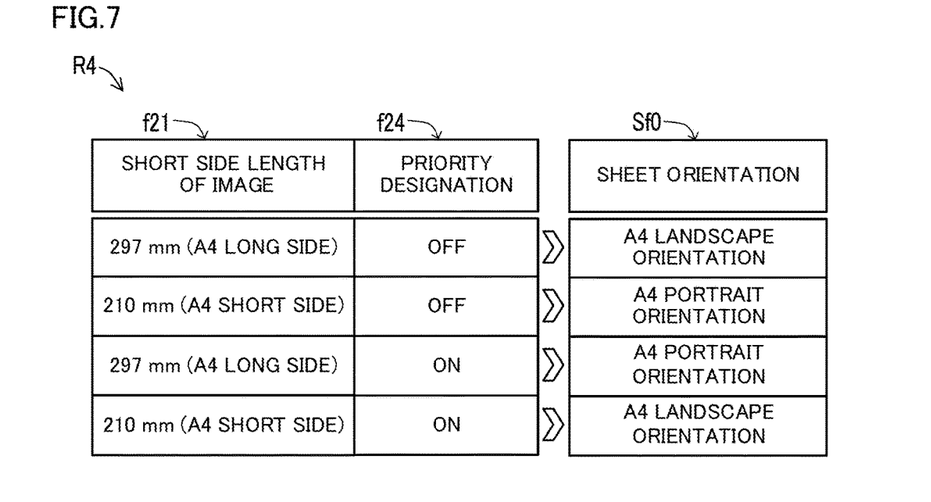
FIG. 7 is a diagram showing a fourth image formation rule in the image processing apparatus according to the embodiment.

The fourth image formation rule R4 derives a sheet orientation Sf0 from a combination of what are designated by the short side length information f21 and the priority designating information f24. The sheet orientation Sf0 indicates an orientation in which the sheet 92 is conveyed by the conveying mechanism 2b.

In the example shown in FIG. 7, "A4 landscape orientation" indicates an orientation in which the transverse side of the sheet 92 of A4 size extends along the sheet conveying direction. On the other hand, "A4 portrait orientation" indicates an orientation in which the longitudinal side of the sheet 92 of A4 size extends along the sheet conveying direction.

The process control device 51a selects one of the two sheet storing portions 2a corresponding to the sheet orientation Sf0.

As shown in FIG. 7, according to the fourth image formation rule R4, two different sheet orientations Sf0 are derived for each different piece of priority designating information f24, even for the same piece of short side length information f21. The conveying mechanism 2b sends out and conveys the sheet 92 from one of the two sheet storing portions 2a corresponding to the sheet orientation Sf0 specified by the fourth image formation rule R4.

The first image formation rule R1, the second image formation rule R2, the third image formation rule R3, and the fourth image formation rule R4 are examples of rules for specifying the division positions Ps1, the dividing order, and the sheet orientation Sf0 in response to the combination of what are designated by the short side length information f21, the image direction information f22, the binding position information f23, the priority designating information f24, and the post-processing information f25.

FIG. 8 to FIG. 13 schematically show the long image g0, and the printed matter 92x obtained by the dividing print process based on the image formation rules shown in FIG. 4 to FIG. 7. In the examples shown in FIG. 8 to FIG. 13, all of the pieces of short side length information f21 are 297 mm (length of the long side of the standard A4 size), and the post-processing information f25 is "staple".

In addition, FIG. 8 to FIG. 13 show examples in which the long image g0 is divided into four parts in its longitudinal direction. In addition, in FIG. 8 to FIG. 13, for convenience, the divided images g1 are represented by A, B, C, and D in order from a divided image g1 nearest to the starting end of the long image g0. Furthermore, in FIG. 8 to FIG. 13, an orientation of A, B, C, and D represents an orientation of the divided images g1.

Figure 8:
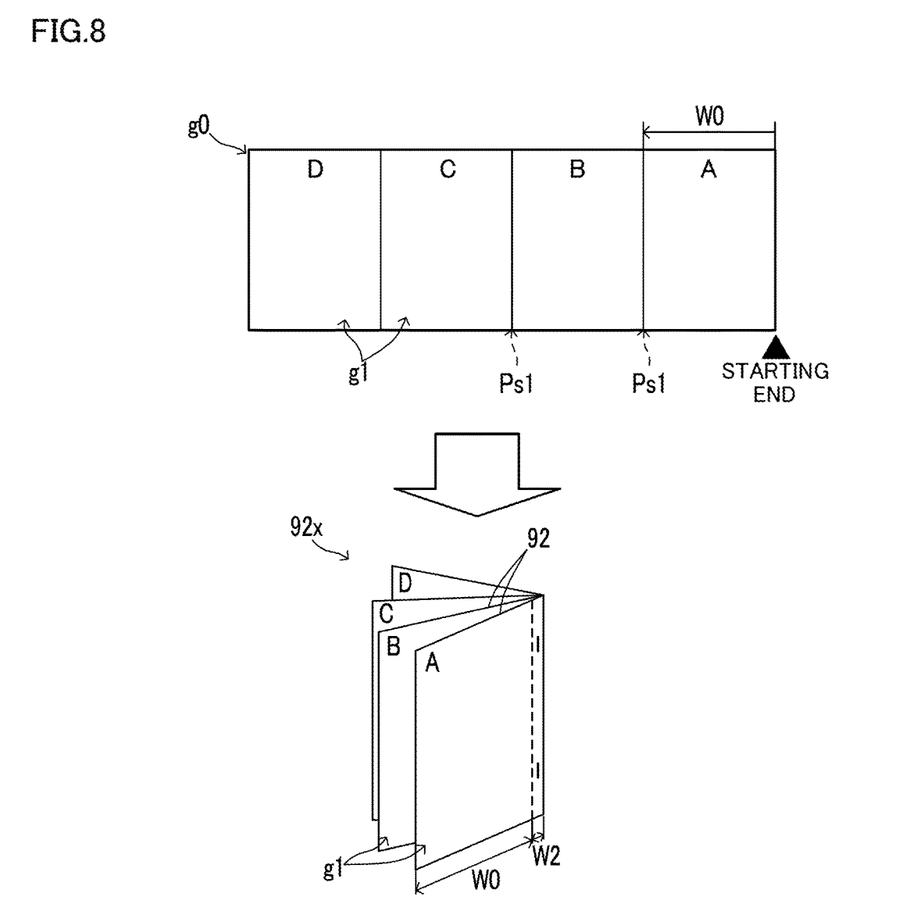
FIG. 8 is a diagram schematically showing a long image starting from a right end, and a piece of printed matter bound at a right side.

FIG. 8 shows an example in which the binding position information f23 is set to "right side", and the priority designating information f24 is set to "OFF" for the long image g0 starting from its right end. In this case, the division starting point St0 is set to "right end" based on the third image formation rule R3. Furthermore, the sheet orientation Sf0 is set to "A4 landscape orientation" based on the fourth image formation rule R4.

Accordingly, the image processing device 54 sequentially divides the long image g0 in order from its right end side by the division width W0, and the print processing device 2 forms the divided images g1 respectively on the sheets 92 according to the dividing order. With this configuration, in the printed matter 92x bound on its right side, the divided images g1 are arranged in the page order corresponding to the significant orientation of the long image g0.

Figure 9:
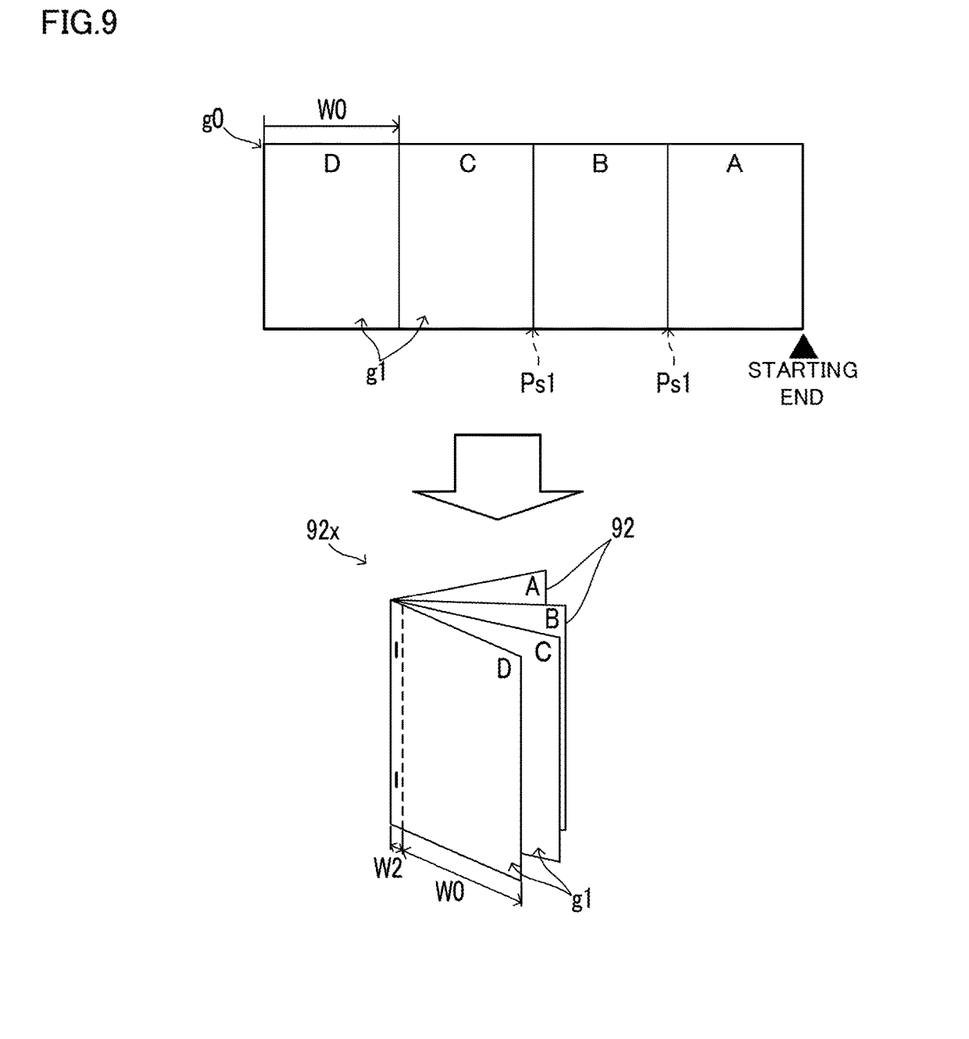
FIG. 9 is a diagram schematically showing a long image starting from a right end, and a piece of printed matter bound at a left side.

FIG. 9 shows an example in which the binding position information f23 is set to "left side", and the priority designating information f24 is set to "OFF" for the long image g0 starting from its right end. In this case, the division starting point St0 is set to "left end" based on the third image formation rule R3. Furthermore, the sheet orientation Sf0 is set to "A4 landscape orientation" based on the fourth image formation rule R4.

Accordingly, the image processing device 54 sequentially divides the long image g0 in order from its left end side by the division width W0, and the print processing device 2 forms the divided images g1 respectively on the sheets 92 according to the dividing order. With this configuration, in the printed matter 92x bound on its left side, the divided images g1 are arranged in the page order corresponding to the significant orientation of the long image g0.

Figure 10:
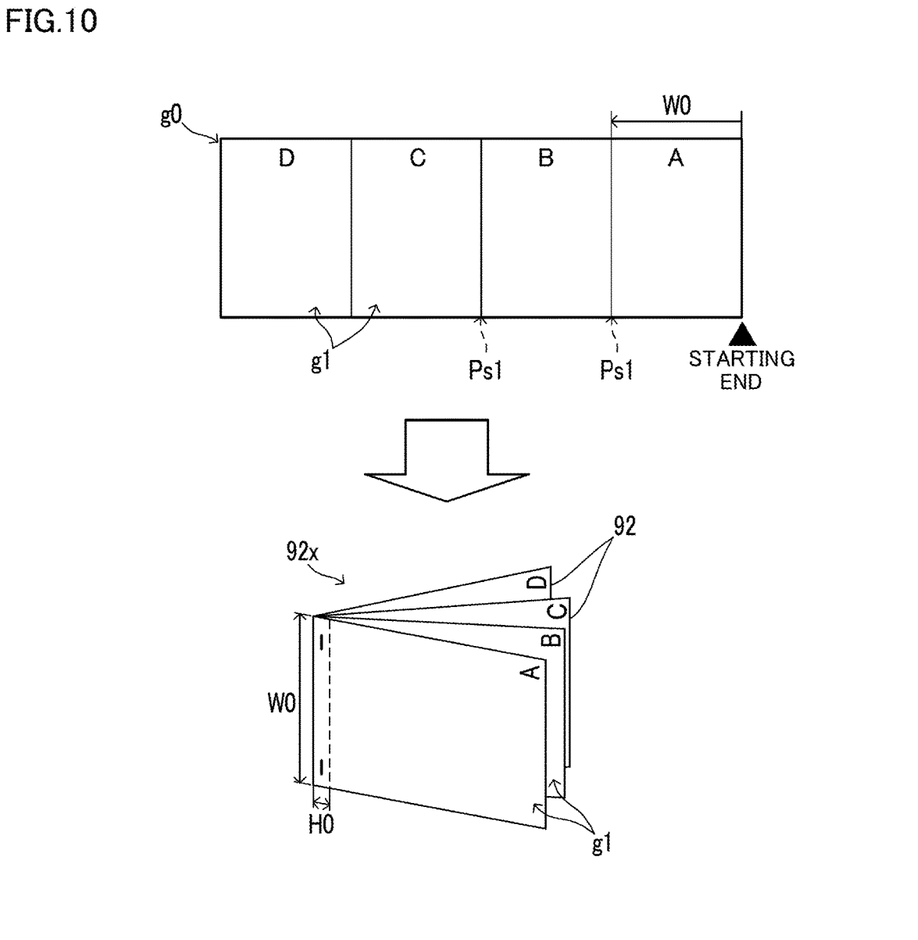
FIG. 10 is a diagram schematically showing a long image starting from a right end, and a piece of printed matter bound at a left side when priority is designated.

FIG. 10 shows an example in which the binding position information f23 is set to "left side", and the priority designating information f24 is set to "ON" for the long image g0 starting from its right end. In this case, the division starting point St0 is set to "right end" based on the third image formation rule R3. Furthermore, the sheet orientation Sf0 is set to "A4 portrait orientation" based on the fourth image formation rule R4.

Accordingly, the image processing device 54 sequentially divides the long image g0 in order from its right end side by the division width W0, and the print processing device 2 forms the divided images g1 respectively on the sheets 92 according to the dividing order. Furthermore, the image processing device 54 rotates the divided images g1 by 90 degrees in correspondence with the sheet orientation Sf0.

When the print processing device 2 electrophotographically forms the divided images g1 respectively on the sheets 92, continuity tends to deteriorate at both end portions in the sub-scanning direction of the sheets 92. As mentioned above, the sub-scanning direction is the sheet conveying direction.

In the electrophotographic print processing device 2, when the toner image is formed in a leading end portion of the sheet conveying direction of the sheet 92, the leading end portion of the sheet 92 tends to adhere to a heating roller of the fixing device 2h. When the leading end portion of the sheet 92 adheres to the heating roller, the sheet 92 gets caught in the heating roller, and a printing defect tends to occur in which image quality deteriorates.

Furthermore, in the electrophotographic print processing device 2, a rear end portion of the sheet conveying direction of the sheet 92 tends to relatively strongly collide with a wall of the sheet conveyance path, when the sheet 92 is being conveyed by the conveying mechanism 2b. Accordingly, a printing defect tends to occur in which image quality of the toner image in the rear end portion of the sheet 92 deteriorates.

When the printing defect occurs, reproducibility at boundary portions between the divided images g1, or in other words, the continuity of the divided images g1 is impaired when the sheets 92 are aligned along the sub-scanning direction.

In addition, when margins are set for both of the end portions in the sub-scanning direction of the sheet 92, the divided images g1 become divided by the margins when the sheets 92 are aligned along the sub-scanning direction. Accordingly, the continuity of the divided images g1 in the printed matter 92x is impaired.

In the example shown in FIG. 10, the priority designating information f24 is set to "ON". Accordingly, the boundary portions between the divided images g1 in the printed matter 92x are formed along end portions in the main scanning direction of the sheet 92. In the end portions in the main scanning direction of the sheet 92, the printing defects are unlikely to occur.

Accordingly, a piece of printed matter 92x with good continuity of divided images g1 can be obtained by specifying the division positions Ps1, the dividing order, and the sheet orientation Sf0 from a combination of what are designated by the image direction information f22, the binding position information f23, and the priority designating information f24.

It is noted that FIG. 10 shows an example of the printed matter 92x bound at its left side, but the same effect can be obtained when the printed matter 92x is bound at its right side.

Figure 11:
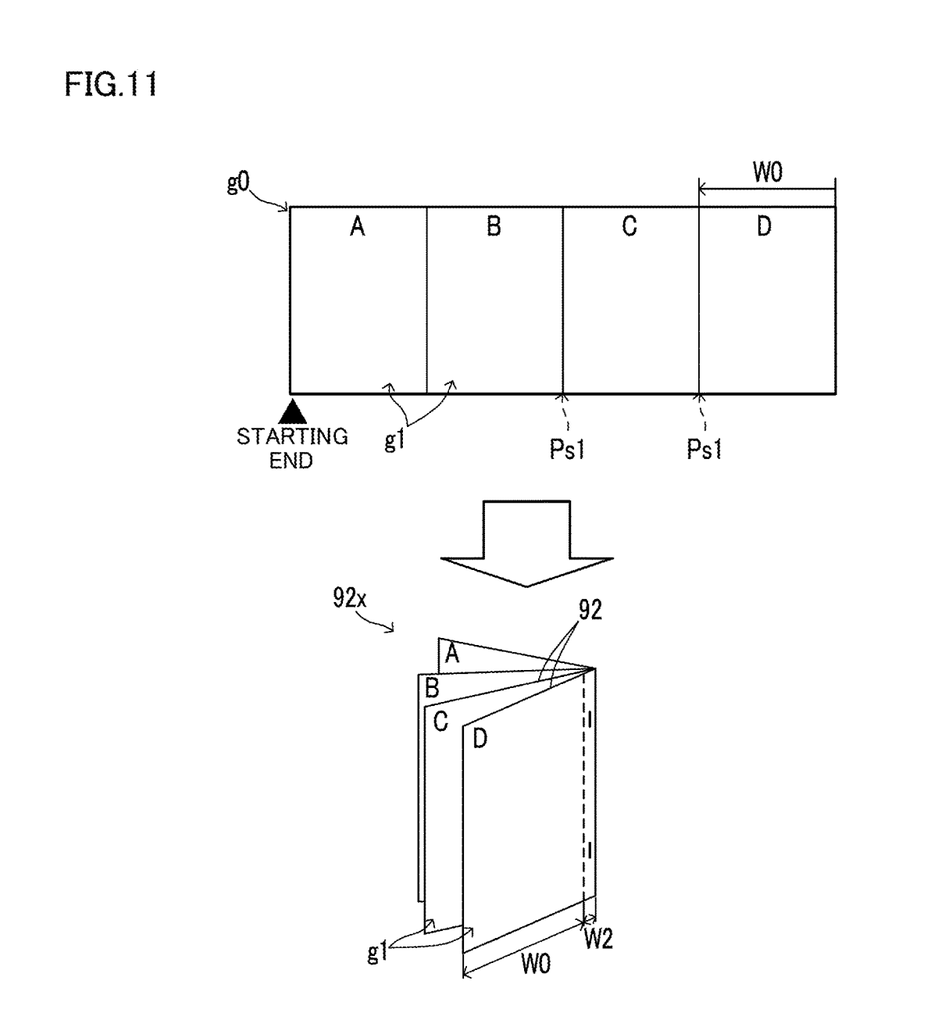
FIG. 11 is a diagram schematically showing a long image starting from a left end, and a piece of printed matter bound at a right side.

FIG. 11 shows an example in which the binding position information f23 is set to "right side", and the priority designating information f24 is set to "OFF" for the long image g0 starting from its left end. In this case, the division starting point St0 is set to "right end" based on the third image formation rule R3. Furthermore, the sheet orientation Sf0 is set to "A4 landscape orientation" based on the fourth image formation rule R4.

Accordingly, the image processing device 54 sequentially divides the long image g0 in order from its right end side by the division width W0, and the print processing device 2 forms the divided images g1 respectively on the sheets 92 according to the dividing order. With this configuration, in the printed matter 92x bound on its right side, the divided images g1 are arranged in the page order corresponding to the significant orientation of the long image g0.

Figure 12:
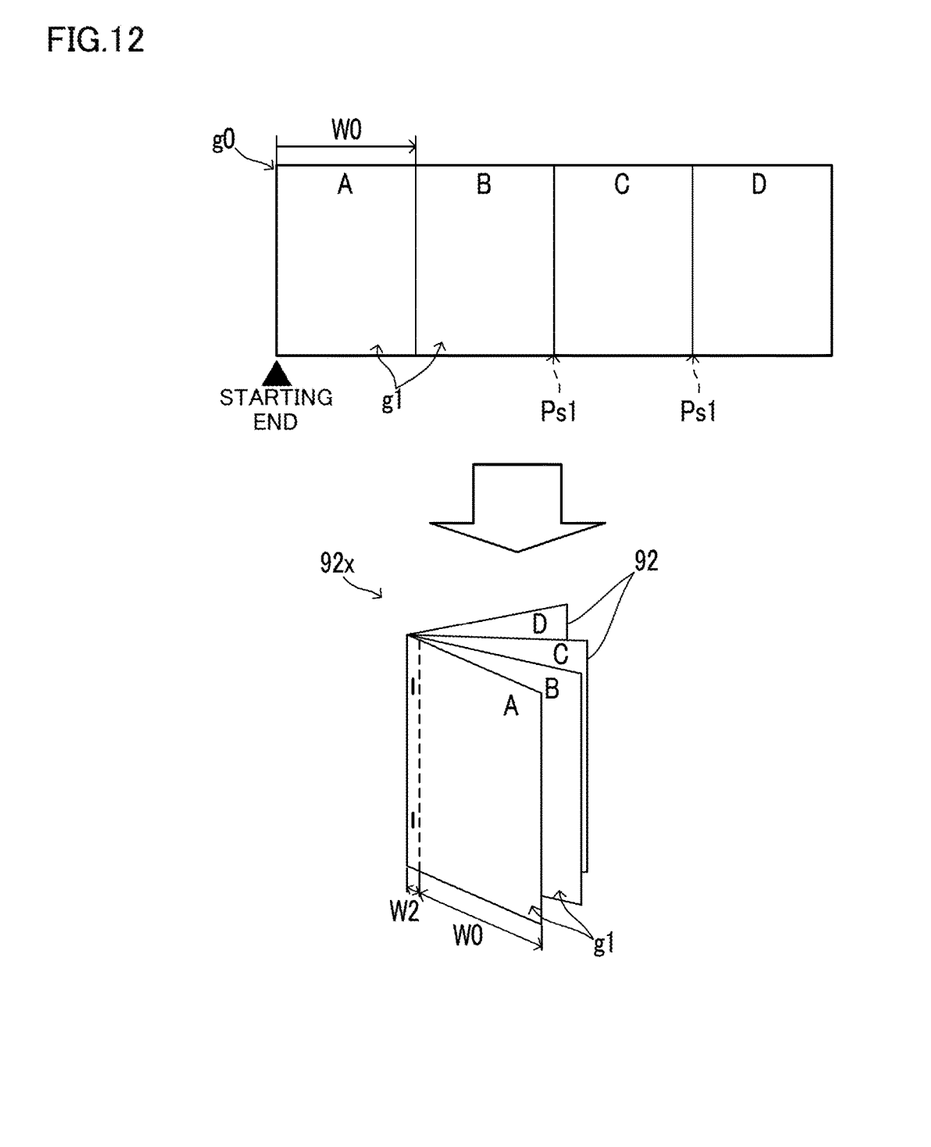
FIG. 12 is a diagram schematically showing a long image starting from a left end, and a piece of printed matter bound at a left side.

FIG. 12 shows an example in which the binding position information f23 is set to "left side", and the priority designating information f24 is set to "OFF" for the long image g0 starting from its left end. In this case, the division starting point St0 is set to "left end" based on the third image formation rule R3. Furthermore, the sheet orientation Sf0 is set to "A4 landscape orientation" based on the fourth image formation rule R4.

Accordingly, the image processing device 54 sequentially divides the long image g0 in order from its left end side by the division width W0, and the print processing device 2 forms the divided images g1 respectively on the sheets 92 according to the dividing order. With this configuration, in the printed matter 92x bound on its left side, the divided images g1 are arranged in the page order corresponding to the significant orientation of the long image g0.

Figure 13:
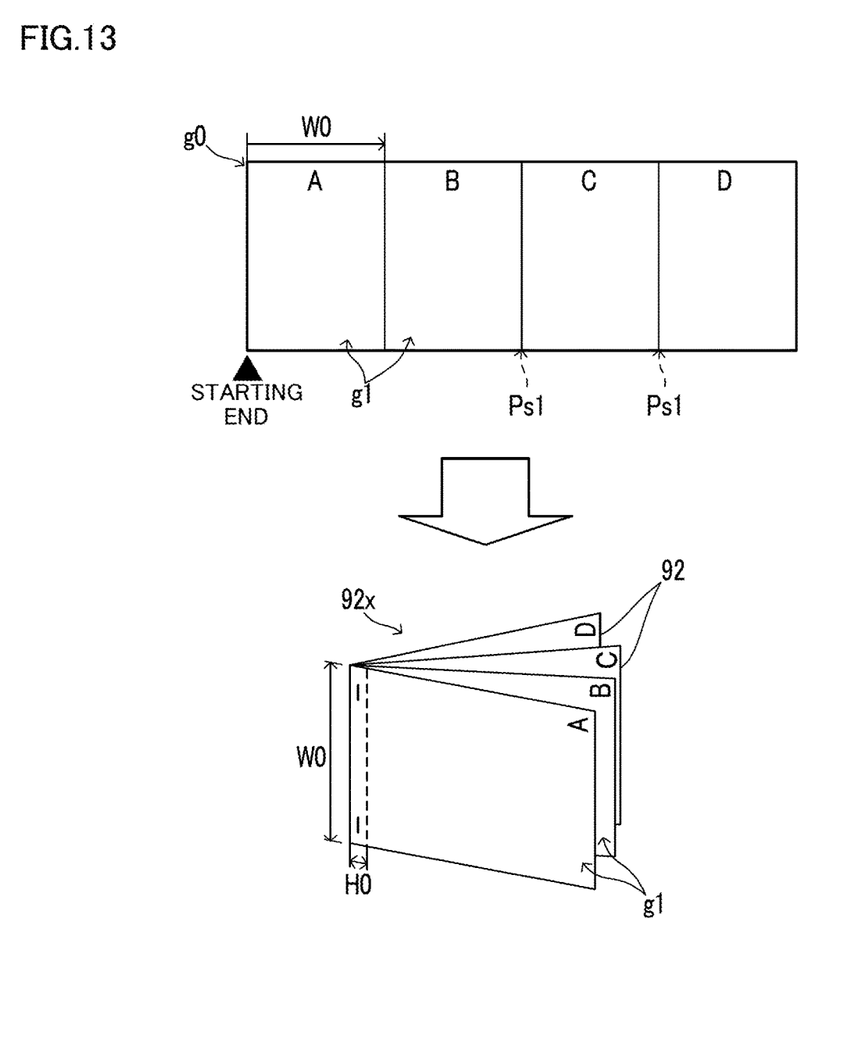
FIG. 13 is a diagram schematically showing a long image starting from a left end, and a piece of printed matter bound at a left side when priority is designated.

FIG. 13 shows an example in which the binding position information f23 is set to "left side", and the priority designating information f24 is set to "ON" for the long image g0 starting from its left end. In this case, the division starting point St0 is set to "left end" based on the third image formation rule R3. Furthermore, the sheet orientation Sf0 is set to "A4 portrait orientation" based on the fourth image formation rule R4.

Accordingly, the image processing device 54 sequentially divides the long image g0 in order from its left end side by the division width W0, and the print processing device 2 forms the divided images g1 respectively on the sheets 92 according to the dividing order. Furthermore, the image processing device 54 rotates the divided images g1 by 90 degrees in correspondence with the sheet orientation Sf0.

The same effects shown in FIG. 10 can be obtained in the example shown in FIG. 13.

[Example Application]

A portion or all of the short side length information f21, the priority designating information f24, and the post-processing information f25 may be omitted from the condition information.

For example, if the length of the transverse direction of the long image g0 is predetermined, the short side length information f21 can be omitted. In addition, a state in which the priority designating information f24 is omitted from the condition information is the same as a state in which the priority designating information f24 is always set to "OFF".

When the post-processing information f25 is omitted from the condition information, the first image formation rule R1 and the second image formation rule R2 may be replaced by a rule in which the division width W0 is uniquely determined in response to the length of the transverse direction of the long image g0.

In addition, when the image forming apparatus 10 does not include the post-processing device 4, the post-processing information f25 of the condition information is omitted.

It is to be understood that the embodiment herein is illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:
   a conveying mechanism configured to convey a sheet;
   a condition acquiring device configured to acquire condition information including binding position information for designating one of an upstream end and a downstream end of the sheet in a sheet conveying direction;
   a dividing condition setting device configured to set, based on the condition information, at least one dividing position and a dividing order in a longitudinal direction of an original image represented by input image data;
   an image processing device configured to divide the original image at the at least one dividing position into a plurality of divided images;
   a print processing device configured to form the plurality of divided images respectively on a plurality of sheets sequentially conveyed by the conveying mechanism according to the dividing order; and
   two sheet storing portions configured to respectively store the plurality of sheets of a same size in different orientations, wherein
   the condition information further includes image direction information for designating which of two ends of the original image in the longitudinal direction is a starting end,
   the dividing condition setting device specifies the at least one dividing position and the dividing order according to a predetermined image formation rule for deriving the at least one dividing position and the dividing order, in response to a combination of at least what are designated by the image direction information and the binding position information,
   the print processing device is configured to form an image on the plurality of sheets electrophotographically,
   the condition information further includes priority designating information for designating whether or not continuity of the plurality of divided images is prioritized over the binding position information,
   the image processing device is configured to specify the at least one dividing position, the dividing order, and an orientation of the sheet according to the image formation rule for deriving the at least one dividing position, the dividing order, and the orientation of the plurality of sheets from a combination of at least what are designated by the image direction information, the binding position information, and the priority designating information, and
   the conveying mechanism is configured to send out and convey the sheet from one of the two sheet storing portions corresponding to the orientation of the sheet specified according to the image formation rule.

2. An image forming apparatus, comprising:
   a conveying mechanism configured to convey a sheet;
   a condition acquiring device configured to acquire condition information including binding position information for designating one of an upstream end and a downstream end of the sheet in a sheet conveying direction;
   a dividing condition setting device configured to set, based on the condition information, at least one dividing position and a dividing order in a longitudinal direction of an original image represented by input image data;
   an image processing device configured to divide the original image at the at least one dividing position into a plurality of divided images;
   a print processing device configured to form the plurality of divided images respectively on a plurality of sheets sequentially conveyed by the conveying mechanism according to the dividing order;
   a post-processing device configured to process a portion corresponding to one of the upstream end and the downstream end designated by the binding position information in the plurality of sheets on which the plurality of divided images have been formed, the sheets having been sequentially conveyed by the conveying mechanism; and
   two sheet storing portions configured to respectively store the plurality of sheets of a same size in different orientations, wherein
   the condition information further includes image direction information for designating which of two ends of the original image in the longitudinal direction is a starting end,
   the dividing condition setting device specifies the at least one dividing position and the dividing order according to a predetermined image formation rule for deriving the at least one dividing position and the dividing order, in response to a combination of at least what are designated by the image direction information and the binding position information,
   the condition information further includes post-processing information designating whether or not the post-processing device performs a process on a piece of printed matter,
   the image processing device is configured to specify the at least one dividing position and the dividing order according to the image formation rule for deriving the at least one dividing position and the dividing order in response to a combination of at least what are designated by the image direction information, the binding position information, and the post-processing information, the print processing device is configured to form the plurality of divided images in a range excluding a portion corresponding to the binding position information of the plurality of sheets, when the post-processing information designates for the process to be performed, the post-processing device is configured to perform the process on the plurality of sheets on which the plurality of divided images have been formed, when the post-processing information designates for the process to be performed, the print processing device is configured to form an image on the plurality of sheets electrophotographically, the condition information further includes priority designating information for designating whether or not continuity of the plurality of divided images is prioritized over the binding position information, the image processing device is configured to specify the at least one dividing position, the dividing order, and an orientation of the sheet according to the image formation rule for deriving the at least one dividing position, the dividing order, and the orientation of the plurality of sheets from a combination of at least what are designated by the image direction information, the binding position information, and the priority designating information, and the conveying mechanism is configured to send out and convey the sheet from one of the two sheet storing portions corresponding to the orientation of the sheet specified according to the image formation rule.

3. An image forming apparatus, comprising:

a conveying mechanism configured to convey a sheet;

a condition acquiring device configured to acquire condition information including binding position information for designating one of an upstream end and a downstream end of the sheet in a sheet conveying direction;

a dividing condition setting device configured to set, based on the condition information, at least one dividing position and a dividing order in a longitudinal direction of an original image represented by input image data;

an image processing device configured to divide the original image at the at least one dividing position into a plurality of divided images;

a print processing device configured to form the plurality of divided images respectively on a plurality of sheets sequentially conveyed by the conveying mechanism according to the dividing order; and two sheet storing portions configured to respectively store the plurality of sheets of a same size in different orientations, wherein the condition information further includes image direction information for designating which of two ends of the original image in the longitudinal direction is a starting end, the dividing condition setting device specifies the at least one dividing position and the dividing order according to a predetermined image formation rule for deriving the at least one dividing position and the dividing order, in response to a combination of at least what are designated by the image direction information and the binding position information, the print processing device is configured to form an image on the plurality of sheets electrophotographically, the condition information further includes priority designating information for designating whether or not continuity of the plurality of divided images is prioritized over the binding position information, the image processing device is configured to specify the at least one dividing position, the dividing order, and an orientation of the sheet according to the image formation rule for deriving the at least one dividing position, the dividing order, and the orientation of the plurality of sheets from a combination of at least what are designated by the image direction information, the binding position information, and the priority designating information, the conveying mechanism is configured to send out and convey the sheet from one of the two sheet storing portions corresponding to the orientation of the sheet specified according to the image formation rule, the condition acquiring device includes a display device configured to display information, an operation device configured to receive an operation from a user, and a user interface control device configured to display on the display device a selection screen including information on an item and an option of the condition information, and set the condition information according to a selection operation on the operation device.

* * * * *